United States Patent
Charrier et al.

(10) Patent No.: US 10,704,669 B2
(45) Date of Patent: Jul. 7, 2020

(54) PLANETARY REDUCTION GEAR RING GEAR FOR A TURBINE ENGINE

(71) Applicant: SAFRAN TRANSMISSION SYSTEMS, Colombes (FR)

(72) Inventors: Mathieu Jean Charrier, Puteaux (FR); Boris Pierre Marcel Morelli, Paris (FR); Adrien Louis Simon, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 40 days.

(21) Appl. No.: 16/211,133

(22) Filed: Dec. 5, 2018

(65) Prior Publication Data
US 2019/0170240 A1  Jun. 6, 2019

(30) Foreign Application Priority Data

Dec. 6, 2017 (FR) ...................................... 17 61732

(51) Int. Cl.
*F16H 57/04* (2010.01)
*F16H 55/17* (2006.01)
(Continued)

(52) U.S. Cl.
CPC ......... *F16H 57/0427* (2013.01); *F01D 25/18* (2013.01); *F02C 7/36* (2013.01);
(Continued)

(58) Field of Classification Search
None
See application file for complete search history.

(56) References Cited

U.S. PATENT DOCUMENTS 8,708,863 B2 * 4/2014 McCune ................. F01D 5/027
475/159
8,777,792 B2 * 7/2014 Imai ...................... F16H 57/042
475/159
(Continued)

FOREIGN PATENT DOCUMENTS

EP   2644939 A1   10/2013
FR   2853382 A1   10/2004
(Continued)

OTHER PUBLICATIONS

Preliminary Research Report and Written Opinion received for French Application No. 1761732, dated Jul. 4, 2018, 8 pages (1 page of French Translation Cover Sheet and 7 pages of original document).

*Primary Examiner* — Dirk Wright
(74) *Attorney, Agent, or Firm* — Womble Bond Dickinson (US) LLP (57) ABSTRACT

A planetary reduction gear ring gear for a turbine engine, in particular of an aircraft, the ring gear extending about an axis (X) and including first and second coaxial annular elements and respectively two inner annular teeth oriented differently. The first and second annular elements include respectively first and second radially external annular flanges to secure the first and second elements to one another, the teeth of the first and second annular elements being axially spaced from one another and from a joint plane (P) of the first and second flanges, and defining between them an annular space externally delimited by two annular rims supporting respectively the flanges. At least one of the flanges includes joint plane notches that are substantially radial for the oil to pass through by centrifugation. The ring gear further includes an annular row of oil-retention walls protruding from the rims in the space.

9 Claims, 4 Drawing Sheets

(51) Int. Cl.
*F16H 57/08* (2006.01)
*F16H 1/28* (2006.01)
*F02C 7/36* (2006.01)
*F01D 25/18* (2006.01)

(52) U.S. Cl.
CPC ............... *F16H 1/28* (2013.01); *F16H 55/17* (2013.01); *F16H 57/0428* (2013.01); *F16H 57/0482* (2013.01); *F16H 57/0486* (2013.01); *F16H 57/08* (2013.01); *F05D 2260/40311* (2013.01); *F05D 2260/98* (2013.01); *F16H 2055/176* (2013.01)

(56) References Cited

U.S. PATENT DOCUMENTS

| | | | |
|---|---|---|---|
| 9,404,381 B2 * | 8/2016 | NguyenLoc | ............ F01D 15/12 |
| 2004/0259679 A1 | 12/2004 | Becquerelle et al. | |
| 2011/0299974 A1 | 12/2011 | Gauthier et al. | |
| 2013/0225353 A1 | 8/2013 | Gallet et al. | |
| 2014/0069743 A1 | 3/2014 | Xu | |
| 2018/0163850 A1 | 6/2018 | Lao et al. | |

FOREIGN PATENT DOCUMENTS

| | | |
|---|---|---|
| FR | 2942284 A1 | 8/2010 |
| FR | 2987402 A1 | 8/2013 |
| FR | 2987416 A1 | 8/2013 |
| FR | 2987417 A1 | 8/2013 |
| FR | 3035375 A1 | 10/2016 |
| FR | 3041054 A1 | 3/2017 |
| FR | 3047279 A1 | 8/2017 |
| WO | 2017/129926 A1 | 8/2017 |

* cited by examiner

PLANETARY REDUCTION GEAR RING GEAR FOR A TURBINE ENGINE

FIELD OF THE INVENTION

The present invention relates to the field of planetary reduction gears for turbine engines, in particular of an aircraft.

STATE OF THE ART

The state of the art comprises, in particular, documents FR-A1-2 853 382, FR-A1-2 942 284, FR-A1-2 987 402, FR-A1-2 987 416, FR-A1-2 987 417, FR-A1-3 041 054, FR-A1-3 047 279, US-A1-2014069743, EP-A1-2 644 939 and FR-A1-3 035 375.

Current turbine engines, in particular turbine engines comprising one or several propellers generating a secondary flow, comprise a transmission system, called reduction gear, to drive the propeller(s) at an adequate rotational speed from the turbine shaft driving the primary body of the engine.

The functioning of reduction gears, in particular in turbine engines provided with a fan propeller with an elevated dilution rate, requires a particularly high flow rate of oil to ensure the lubrication and cooling of their gears and bearings. The oil flow rate depends on the architecture and is, for example, of the order of 6000 to 7000 litres per hour during take-off for a given architecture.

Among the reduction gears used, there are planetary and epicyclic reduction gears that feature the advantage of providing significant reduction rates of the rotational speed in reduced spaces.

This reduction gear comprises a central gear, called a sun gear, and an outer ring gear with planet gears, that are engaged with the sun gear and the ring gear, the support of one of these three components having to be rotationally immobilised for the functioning of the gear train.

When the planet carrier is rotationally secured, the sun gear and the ring gear are driving and driven, respectively, or inversely. The reduction gear is then of the "planetary" type. In the opposite case of an epicyclic reduction gear, the outer ring gear is rotationally immobilised and the sun gear and planet carrier are respectively driving and driven. The present invention relates to a planetary reduction gear in which the ring gear is mobile.

One of the problems with this type of reduction gear is ensuring the proper lubrication of the meshing between the sun gear and the planet gears among themselves. These meshing are lubricated during operation by oil supplied by nozzles. Once lubricated, the meshing project oil radially outwards by centrifugation to reach the ring gear.

The ring gear comprises two coaxial annular elements, respectively comprising two annular teeth configured to cooperate with each planet gear. The teeth of the ring gear are of the chevron type, the teeth of the elements having substantially opposing helix angles. The annular elements of the ring gear comprise externally radial annular flanges to secure the elements to one another, as well as to an annular ring carrier configured to extend around at least a part of the ring gear. The teeth of the annular elements are spaced axially from one another and from a joint plane of the flanges. These teeth therefore define between them an annular space delimited externally by two annular rims respectively supporting the flanges. According to the current state of the art, the centrifuged oil flows into this space and onto the rims. It is then radially evacuated outwards by passing through notches that are substantially radial and formed in the flanges at the level of their joint plane.

However, during operation, owing to the rotation of the ring gear, the oil tends to slip onto the rims supporting the flanges and it is then difficult to evacuate it through the notches. These oil slips increase during the acceleration phases of the reduction gear when the viscosity of the oil is low. This phenomenon lowers the efficiency of the evacuation of the oil, and can have numerous detrimental consequences, such as the recirculation of the oil, the heating of the oil and therefore potentially of the meshing, etc.

The present invention proposes an improvement that provides a simple, efficient and economical solution to this problem.

SUMMARY OF THE INVENTION

The invention relates to a planetary reduction gear ring gear for a turbine engine, in particular of an aircraft, said ring gear extending about an axis and comprising first and second coaxial annular elements comprising respectively two inner annular teeth oriented differently, said first and second annular elements further comprising respectively first and second radially external annular flanges to secure said first and second elements to one another, the teeth of said first and second annular elements being axially spaced from one another and from a joint plane of said first and second flanges, and defining between them an annular space externally delimited by two annular rims supporting respectively said flanges, at least one of the flanges comprising at the level of said joint plane notches that are substantially radial for the oil to pass through by centrifugation, characterised in that it further comprises an annular row of oil-retention walls protruding from said rims in said space.

The invention therefore proposes to limit, and even to prevent the slippage of oil onto the rims of the ring gear, by means of the retention walls. During operation, under the effect of centrifugal forces, the oil will tend to be prevented from turning with the ring gear and will be stored in pockets, each of which is delimited by adjacent walls. Ideally, each pocket will communicate with at least one crossing notch of the flanges, for the purpose of evacuating the oil outside the ring gear.

The ring gear according to the invention can comprise one or several of the following characteristics, taken individually or in combination:
  each one of said rims comprises an annular row of oil-retention walls, the walls of one of said rims being axially aligned with the walls of the other of said rims; the walls extending between the teeth are therefore each formed with a first section or half of a wall located on one of the elements, and a second section or half of a wall located on the other of the elements; this allows to treat the manufacturability of the ring gears independently from one another; these walls or wall sections are aligned and divide the aforementioned space into several adjacent pockets;
  the walls extend substantially in planes that are parallel to said axis; this guarantees the proper retention of the oil during operation;
  the walls of one of the rims are spaced by an axial clearance from the walls of the other of the rims; this can be useful to facilitate the assembly of the elements forming the ring gears and preventing contact during operation between the walls; alternatively, this clearance can be nil and therefore inexistent.

the walls are placed and secured to the first and second annular elements; this facilitates the manufacturing of the elements;

the walls are formed of a single part with the first and second annular elements; the walls can then be obtained by casting or manufactured by machining operations;

said rims are substantially cylindrical; alternatively, they can be frustoconical to encourage the flow of oil by centrifugation in a radially outwards direction.

The present invention also relates to a planetary reduction gear for a turbine engine, comprising a ring gear such as described above.

This invention relates to a turbine engine, in particular of an aircraft, provided with a reduction gear such as described above.

BRIEF DESCRIPTION OF THE FIGURES

Other characteristics and advantages will appear more clearly upon reading the following description of a non-limiting embodiment of the invention and with reference to the appended drawings, in which.

DETAILED DESCRIPTION OF AN EMBODIMENT OF THE INVENTION

Figure 1:
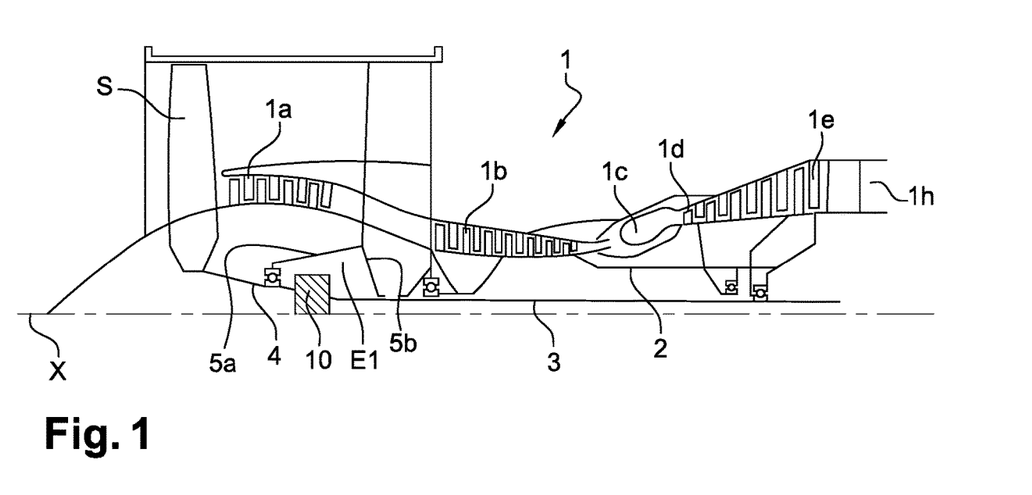
FIG. 1 is a schematic axial cross-section view of a turbine engine using the invention.

FIG. 1 shows a turbine engine 1 that comprises, conventionally, a propeller of a fan S, a low-pressure compressor 1*a*, a high-pressure compressor 1*b*, an annular combustion chamber 1*c*, a high-pressure turbine 1*d*, a low-pressure turbine 1*e*, and an exhaust pipe 1*h*. The high-pressure compressor 1*b* and the high-pressure turbine 1*d* are connected by a high-pressure shaft 2 and form with the latter a high-pressure (HP) body. The low-pressure compressor 1*a* and the low-pressure turbine 1*e* are connected by a low-pressure shaft 3 and form with the latter a low-pressure (BP) body.

The propeller of the fan S is driven by a fan shaft 4 coupled to the BP shaft 3 by means of a planetary reduction gear 10.

The reduction gear 10 is positioned in the front section of the turbine engine. A fixed structure comprising schematically, in this case, an upstream section 5*a* and a downstream section 5*b* is arranged to form an enclosure E1 around the reduction gear 10. This enclosure E1 is here closed in the upstream section by seals located at the level of a bearing and allowing the passage of the fan shaft 4, and in the downstream section by seals at the level of the passage of the BP shaft 3.

In a planetary architecture, the ring carrier (not shown) is made of a part that is more or less flexible and drives the ring gear 14, and a part that is maintained by bearings and on which the fan S is mounted. These attachment means are known to the person skilled in the art and are not detailed herein. A short description thereof can be found, for example, in document FR-A1-2 987 416.

Figure 2:
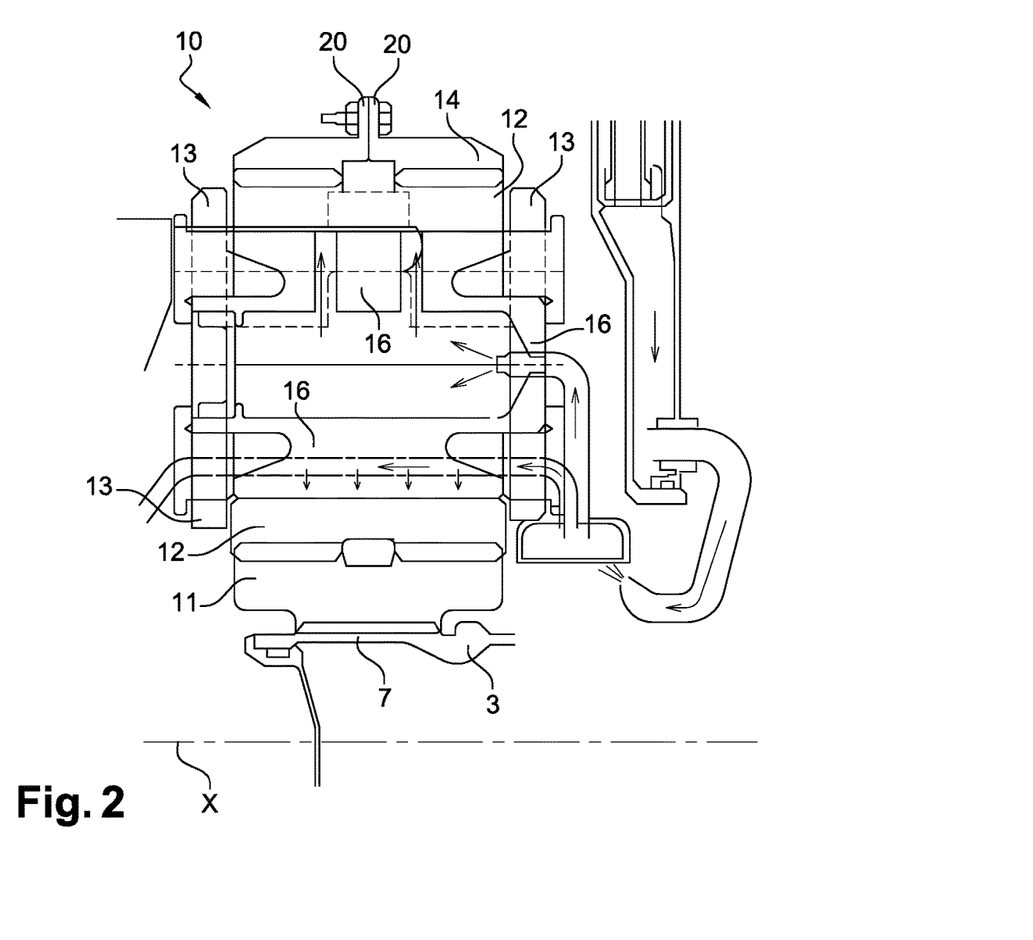
FIG. 2 is a schematic axial cross-section view of an epicyclic reduction gear.

The reduction gear 10 engages, one the one hand, the BP shaft 3 by means of splines 7 that drive a sun gear 11, and on the other hand the shaft of the fan 4, which is attached to a planet carrier 13. Conventionally, the sun gear 11, the rotation axis X of which is the same as that of the turbine engine, drives a series of planet gears 12 that are regularly distributed over the circumference of the reduction gear 10. The number of planet gears 12 generally ranges from three to six. The planet gears 12 rotate about their rotational axes, engaging the inner teeth of the ring gear 14. Each one of these planet gears 12 rotates freely about a planet gear axis 16 connected to the planet carrier 13 by means of a bearing that can be smooth, as shown in FIG. 2, or a bearing with rolling elements (ball bearings or roller bearings). The planet carrier 13 is fixed in the case of a planetary reduction gear.

The rotation of the planet gears 12 about their planet gear axis 16, due to the cooperation of their gears with the teeth of the ring gear 14, drives the rotation of the ring gear 14 about the axis X, and consequently that of the fan shaft 4 to which is connected to it, at a rotational speed that is inferior to that of the BP shaft 3.

FIG. 2 shows the path of the oil towards the reduction gear 10 and its path inside the reduction gear. In FIG. 2, the arrows show the path taken by the oil from, in this example, a surge tank connected to the fixed structure of the turbine engine, all the way to the gears and the bearings that require lubrication.

Figures 3, 4, 5:
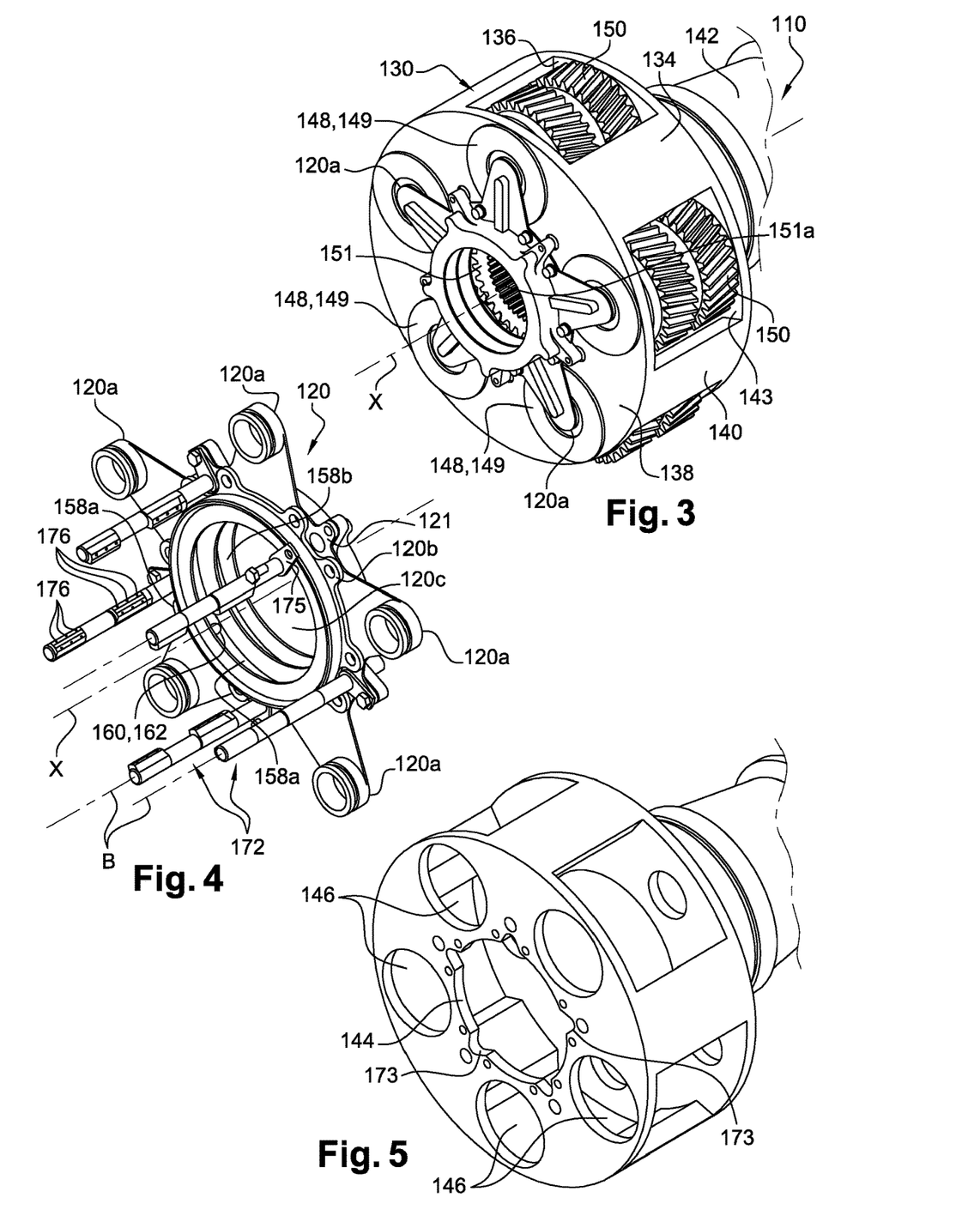
FIG. 3 is a perspective and schematic view of an epicyclic reduction gear.
FIG. 4 is schematic and perspective view of a spinning wheel and of nozzles of the reduction gear of FIG. 3.
FIG. 5 is a schematic and perspective view of a planet carrier of the reduction gear of FIG. 3.

FIGS. 3 to 5 show a more concrete example of a reduction gear 110. Although it is of the epicyclic type, the reduction gear 110 enables an understanding of the arrangement and cooperation of the parts of a reduction gear.

The reference 130 designates the planet carrier of the reduction gear 110, which is here of the single block type comprising a part that forms a cage 134 and a part that forms a barrel 142. The cage comprises two coaxial annular walls 136, 138 connected at their periphery by a cylindrical wall 140.

The annular wall 136 is secured to the substantially cylindrical barrel 142, partially visible, comprising means for meshing with a disk of the fan of the turbine engine. The coupling means are for example longitudinal splines.

In the example shown, the cylindrical wall 140 is openwork and comprises small holes 143 that traverse it in the radial direction, enabling the assembly of the planet gears.

The wall 138 comprises a central opening 144 (enabling the assembly of the sun gear) centred on the axis X and a series of orifices 146 regularly distributed about the axis X, the opening 144 and the orifices 146 extending therethrough in the axial direction (FIG. 5).

The orifices 146 are used for the assembly of the rotation axes 148 of the planet gears 150. The axes 148 are parallel to the axis X and are mounted in the cage 134 by an axial translation motion through the orifices 146. They are secured at their longitudinal ends to the walls 136, 138 respectively.

The planet gears 150 are rotationally mounted on the axes 148 and their outer peripheries partially run through the holes 143 for the purpose of meshing them with the outer ring gear of the reduction gear configured to surround the cage 134.

The planet gears 150 mesh with the sun gear 151, which comprises inner rectilinear splines 151a for coupling with another shaft, such as a turbine shaft.

A spinning wheel 120 is placed and secured to the wall 138 on the side of its external face, i.e. the face that is not located on the side of the planet gears 150. The purpose of the spinning wheel 120 is to lubricate the reduction gear 110 and it comprises lubrication means configured to bring lubricant to nozzles 172 and to the axes 148 of the bearings 149. The supply of oil to the nozzles enables lubrication of the gearing teeth of the planet gears 150 and of the sun gear 151.

The spinning wheel 120 has a generally annular shape and comprises arms 120a protruding radially outwards, of which there are five in the shown example. The spinning wheel 120 is configured to be coaxially mounted on the wall 138 and comprises a face 120b for bearing against and being secured to said wall.

The spinning wheel 120 comprises a central opening 120c externally delimited by an annular section defining two coaxial annular grooves 158a, 158b arranged axially next to one another. These grooves 158a, 158b extend about the axis X and open radially inwards. Their radially external bottom wall comprises orifices that communicate fluidly with radial channels 160 on one hand, and with radial ducts 162 on the other hand.

Although it is not shown, the oil is configured to be projected into the grooves 158a, 158b by lubricant supply means. These means comprise generally a series of injectors arranged about the axis X and that pass through the openings 120c, 144. The injectors are carried by a stator and spray lubricant radially towards to outside directly into the gorges 158a, 158b, and the lubricant will then flow into the channels 160 and ducts 162.

Each of the ducts 162 communicates at its radially outer end with a cavity of an axis 148 for the purpose of supplying lubricant to this axis 148 and the associated bearing 149. The lubricant is brought by ducts 162 and is then injected in the cavities, where it flows through the abovementioned ducts to the periphery of the bearings 149.

Each one of the channels 160 communicates at its radially outer end with a longitudinal end of a nozzle 172, in particular shown in FIG. 4. The nozzles 172 have an elongated shape and extend in parallel to the axis X. Their elongation axes are denoted B. There are five of them and they are regularly spaced around the axis X, each being arranged between two adjacent axes 148.

Each nozzle 172 comprises orifices 176 for projecting oil on the teeth of the planet gears 150.

The nozzles 172 are secured to the spinning wheel 120 by means of screwed lugs 175, and the spinning wheel 120 is placed and secured by screws on the annular wall 138 of the planet carrier 130.

Figure 6:
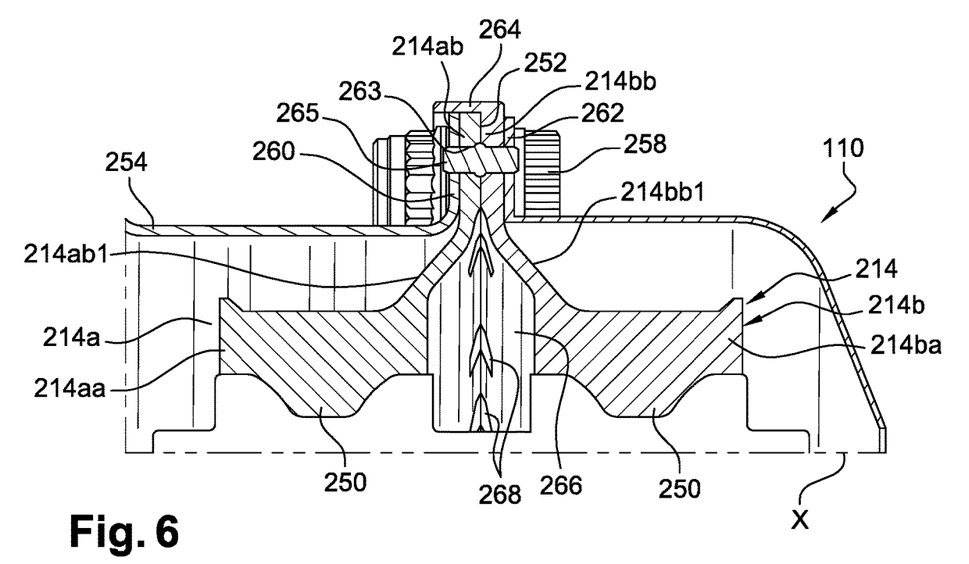
FIG. 6 is a partial schematic and axial cross-section view of a ring gear and of a ring carrier of a reduction gear according to the prior art.
Figure 7:
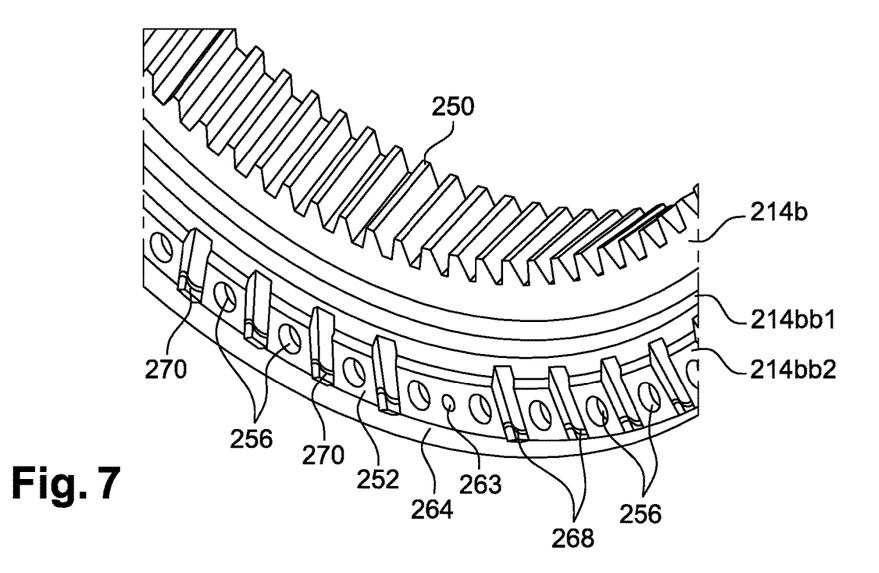
FIG. 7 is a partial schematic and perspective view of the ring gear of FIG. 6.

The FIGS. 6 and 7 show a ring gear 214 of a planetary reduction gear according to the prior art.

The ring gear 214 extends about the axis X of the turbine engine, and comprises two coaxial annular elements, called first annular element 214a or upstream element and second annular element 214b or downstream element.

Each element 214a, 214b comprises an annular body 214aa, 214ba with a general cylindrical shape and connected to an annular flange 214ab, 214bb that extends radially outwards.

Each body 214aa, 214ba comprises inner annular teeth 250 at its inner periphery. Although it is not shown in the drawings, the teeth 250 of the two bodies or elements fit with the teeth of the planet gears, which are of the type shown in FIG. 3. The teeth 250 of the elements 214a, 214b are chevron teeth.

The body 214aa, 214ba of each element is connected by one of its longitudinal ends to the corresponding flange 214ab, 214bb by means of an annular rim 214ab1, 214bb1. The body 214aa is connected at its downstream end, located on the side of the other body 214ba, to the flange 214ab, by the rim 214ab1, and the body 214ba is connected at its upstream end, located on the side of the other body 214aa, to the flange 214bb by the rim 214bb1.

Each flange 214ab, 214bb extends substantially in a radial direction and bears against the other flange in a joint plane P. The rims 214ab1, 214bb1 here have a general frustoconical shape. The rim 214ab1 extends in an upstream to downstream direction outwards and the rim 214bb1 extends in an upstream to downstream direction inwards.

The flanges 214ab, 214bb are provided to secure the elements 214a, 214b to one another, and to the ring carrier 254 in the example shown.

For this purpose, the flanges 214ab, 214bb each comprise an annular row of axial through-orifices 256 for the passage of fixation means 258 of the screw-nut type or similar. The orifices 256 of the flanges 214ab, 214bb are aligned and receive the fixation means 258.

The ring carrier 254 also comprises an annular flange 260 for fixation to the flanges 214ab, 214bb. The flange 260 is applied axially on one of the flanges 214ab, 214bb, in this case the flange 214ab of the upstream element 214a. The flange 214ab is therefore inserted axially between the flange 260 and the flange 214bb. The inverse configuration is also possible. By inverse configuration we mean that the ring carrier is on the right side of the ring gear, which represents the rear of the engine.

The flange 260 comprises orifices that are aligned with the orifices 256 and that also receive the fixation means 258, the heads of which can be applied axially on the downstream face of the flange 214bb and nuts can be applied axially on the upstream face of the flange 260 or inversely. In the example shown, a flange 262 of an annular oil collector bears axially against the flange 214bb and receives on its downstream face the heads of the nuts.

The flanges 214ab, 214bb further comprise a first set of axial tapped through-holes 263 that enable disassembly of the ring carrier 254 with the ring gear 214. A second set of axial tapped through-holes 263 enable disassembly of the element 214a from the element 214b. The flanges 214ab, 214bb also comprise at least one pin 265 for the angular shimming of the elements 214a, 214b. Each flange 214ab, 214bb can comprise one or several of these hole(s) 263, configured to be aligned with one or similar several holes(s) 263 similar of the other section and to receive a shimming pin 265. The pin 265 in this case has a general cylindrical shape and is oriented axially. It comprises an external annular bead, substantially in its middle in the axial direction, and configured to be located substantially at the level of the surfaces 252 of the flanges.

The flange 214bb comprises in its outer periphery a cylindrical centring rim 264. This rim 264, which is carried by the element 214b is configured to cooperate by axial sliding and to bear axially against the outer periphery of the other element 214a to ensure the centring, during assembly and operation, of this other element 214a. Alternatively, the element 214a can comprise such a rim configured to cooperate with the element 214b for the purpose of centring it.

The rim 264 is configured to cooperate with the outer periphery of the flange 214ab of the element 214a. During assembly, the rim 264 therefore extends around the flange 214ab.

In the example shown, the rim 264 also ensures the centring of the ring carrier 254. The rim 264 can cooperate as indicated above with the outer periphery of the flange 260.

The rim 264 extends here continuously over 360°. It is therefore neither split nor divided into sectors. The reference surface for the centring is therefore not interrupted.

The rims 214ab1, 214bb1 delimit an annular space 266 that features here a section with a general triangular shape, the tip of which is radially oriented outwards.

Due to the shape of these rims 214ab1, 214bb1 and their connection, respectively, to the downstream and upstream longitudinal ends of the bodies 214a, 214b, these bodies are axially spaced from one another by a predetermined distance.

Lubrication oil is intended to flow, during operation, through the space 266 between the bodies. Substantially radial passages are provided between the flanges 214ab, 214bb to allow the evacuation of oil radially outside of the ring gear 214.

The oil passages are here formed, on the one hand, by notches 268 or slots that are substantially radial and formed in the surfaces 252 of the flanges. Each flange comprises an annular row of notches 268 axially aligned with the notches 268 of the other of the flanges. The notches are provided at a distance from the orifices 256 for the passage of the fixation means 258, of the hole of the pin 265 and of the holes 263. Each notch has, for example, a cross-section with a semi-circular shape (semi-oblong shape) or a rectangular shape, as in the example shown (FIG. 7).

The notches 268 fluidly communicate, at their radially inner ends, with the cavity 266 and at their axially outer ends with through-orifices 270 with oblong shape for the outlet of oil, formed in the centring rim 264. In other words, the oil passages open at their radially outer ends on the cylindrical outer surface of the rim 264 to form oil outlet orifices 270.

With the exception of the rim 264, the ring gear elements 214a, 214b are symmetrical with respect to a median plane, which is perpendicular to the axis and passes substantially between these elements.

Figure 8:
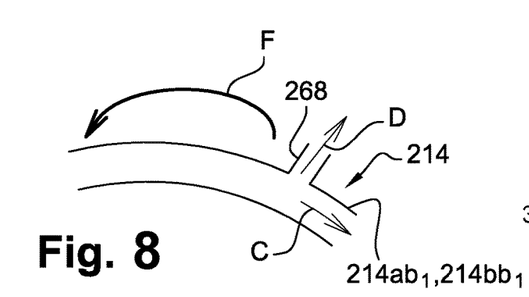
FIG. 8 is a diagram showing the oil slippage phenomenon during operation of the ring gear.

FIG. 8 shows very schematically the oil slip problem that occurs on the rims 214ab1, 214bb1, supporting the flanges, generated by the rotation of the ring gear 214 during operation. This phenomenon is exacerbated during the acceleration phases of the reduction gear and when the viscosity of the oil is low, and reduces the efficiency of the evacuation of the oil.

Figure 9:
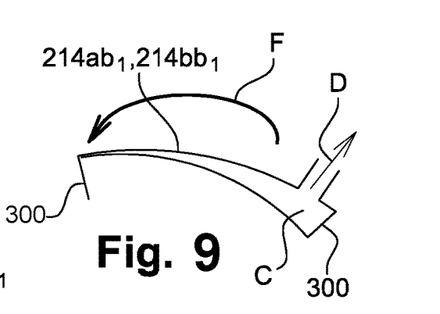
FIG. 9 is a diagram similar to the one of FIG. 8 and showing the solution according to the invention consisting in retaining oil on the ring gear by means of walls.

The invention proposes overcoming this phenomenon by adding oil retaining or retention walls 300 in the space 266 between the bodies, at the level of the rims 214ab1, 214bb1 supporting the flanges, to prevent the oil being drawn by the ring gear 214 during operation. This principle is schematically shown in FIG. 9, which shows that the walls 300 define between them pockets that are circumferentially oriented around the axis X and designed to retain oil so as to facilitate its flow through the notches 268 in the joint plane of the flanges 214ab, 214bb.

Figure 10:
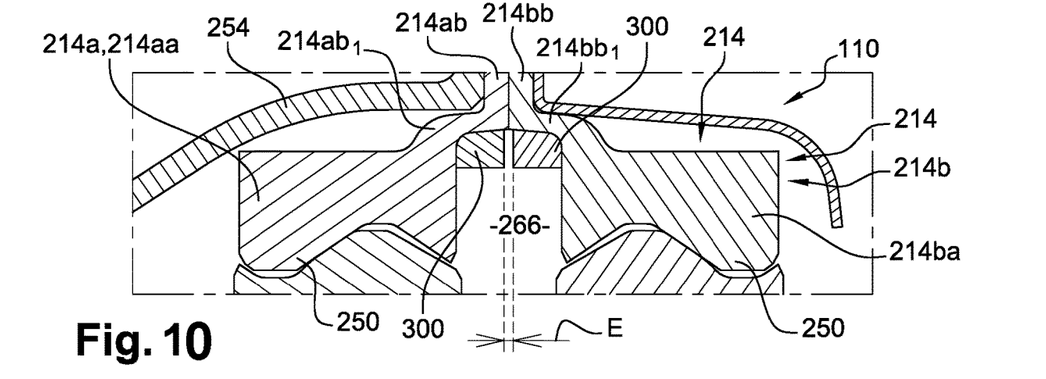
FIG. 10 is a partial schematic and axial cross-section view of an embodiment of a reduction gear according to the invention.

FIG. 10 shows a more concrete embodiment of the invention.

The ring gear 214 according to the invention comprises, around the aforementioned axis X an annular row of oil retention walls 300 protruding from the rims 214ab1, 214bb1 into the space 266. Each one of the rims 214ab1, 214bb1 comprises an annular row of oil retention walls 300, the walls of one of said rims being axially aligned with the walls of the other of the rims.

In the example shown, the walls 300 extend substantially in planes parallel to the axis X. The walls 300 of one of the rims are here spaced by an axial clearance E from the walls of the other of the rims.

In a specific embodiment example shown in the drawing, the walls 300 are provided and secured to the annular elements 214a, 214b and in particular on the rims 214ab1, 214bb1. Alternatively, the walls 300 can be formed in one piece with these elements.

Furthermore, in the example shown, the rims 214ab1, 214bb1 have a general shape that is substantially cylindrical but they could otherwise have a general frustoconical shape, as shown in FIG. 6.

The number of walls 300 per element 214a, 214b can be determined based on the number of oil-evacuation notches 268 in the joint plane of the flanges 214ab, 214bb. For example, the number of walls 300 can be equal to the number of notches 268 so that a wall is associated with each notch and is positioned optimally with respect to this notch, in order to facilitate the flow of oil during operation. As is schematically shown in FIG. 9, the wall will be located just downstream from the notch with respect to the direction of the oil slip during operation, which is opposite to the rotational direction (arrow F) of the ring gear 214.

Alternatively, several notches 268 can be associated with each pocket, delimited between two adjacent walls 300, in order for example to accelerate the evacuation of oil from these pockets during operation, and reduce the duration of its storage in the reduction gear.

The invention enables facilitating the evacuation of the oil, in particular during the acceleration phases and when the viscosity of the oil is low. It also reduces the heating of the reduction gear, thereby increasing its lifespan.

The invention claimed is:

1. Ring gear of a planetary reduction gear for a turbine engine, in particular of an aircraft, said ring gear extending about an axis (X) and comprising first and second coaxial annular elements and comprising respectively two inner annular teeth oriented differently, said first and second annular elements further comprising respectively first and second radially external annular flanges to secure said first and second elements to one another, the teeth of said first and second annular elements being axially spaced from one another and from a joint plane (P) of said first and second flanges, and defining between them an annular space externally delimited by two annular rims supporting respectively said flanges, at least one of the flanges comprising at the level of said joint plane notches that are substantially radial for the oil to pass through by centrifugation, wherein it further comprises an annular row of oil-retention walls protruding from said rims in said space.

2. Ring gear according to claim 1, wherein each one of the rims comprises an annular row of oil retention walls, walls of one of said rims being axially aligned with the walls of the other of the rims.

3. Ring gear according to claim 1, wherein the walls extend substantially in planes that are parallel to said axis (X).

4. Ring gear according to claim 1, wherein the walls of one of the rims are spaced by an axial clearance (E) from the walls the other of the rims.

5. Ring gear according to claim 1, wherein the walls are provided and secured to the first and second annular elements.

6. Ring gear according to claim 1, wherein the walls are formed in one piece with the first and second annular elements.

7. Ring gear according to claim 1, wherein said rims are substantially cylindrical.

8. Planetary reductions gear of a turbine engine, comprising a ring gear according to claim 1.

9. Turbine engine, in particular of an aircraft, comprising a reduction gear according to claim 8.

* * * * *